Figure 1:
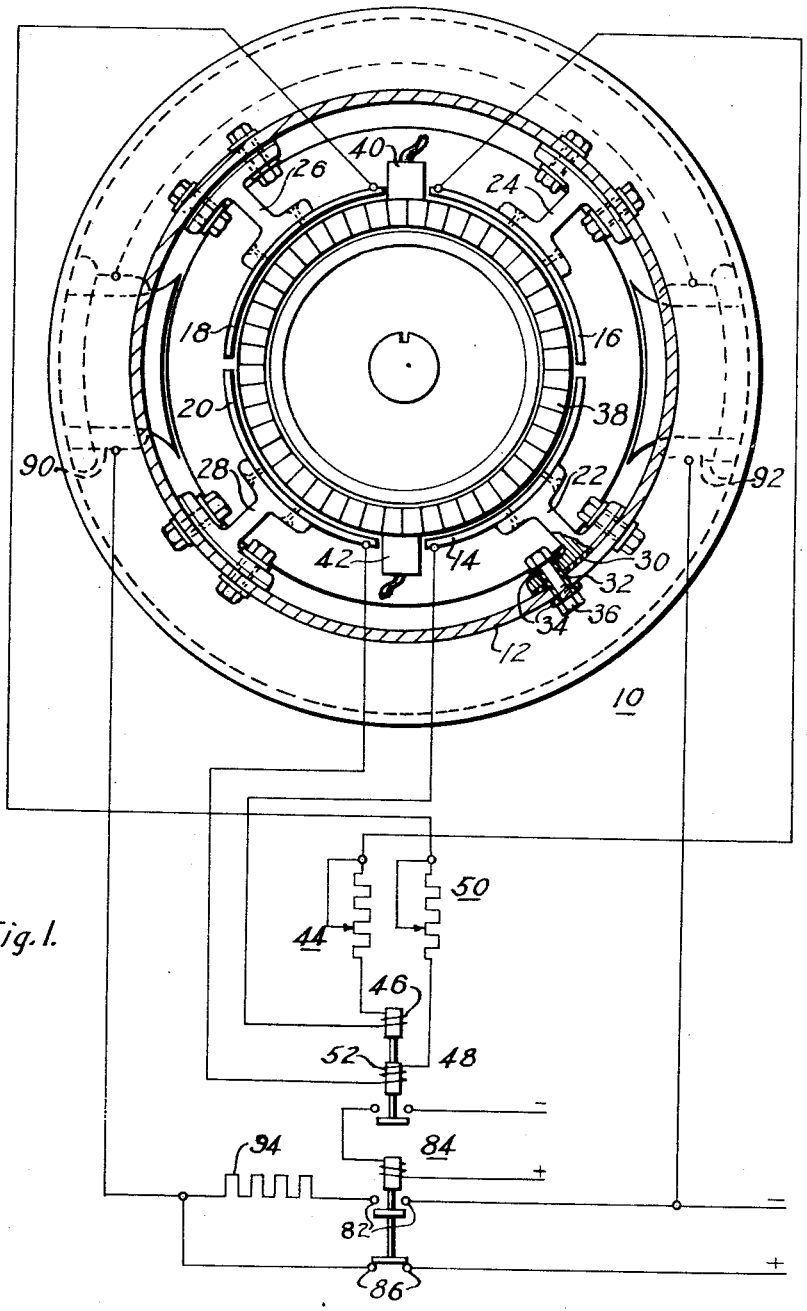

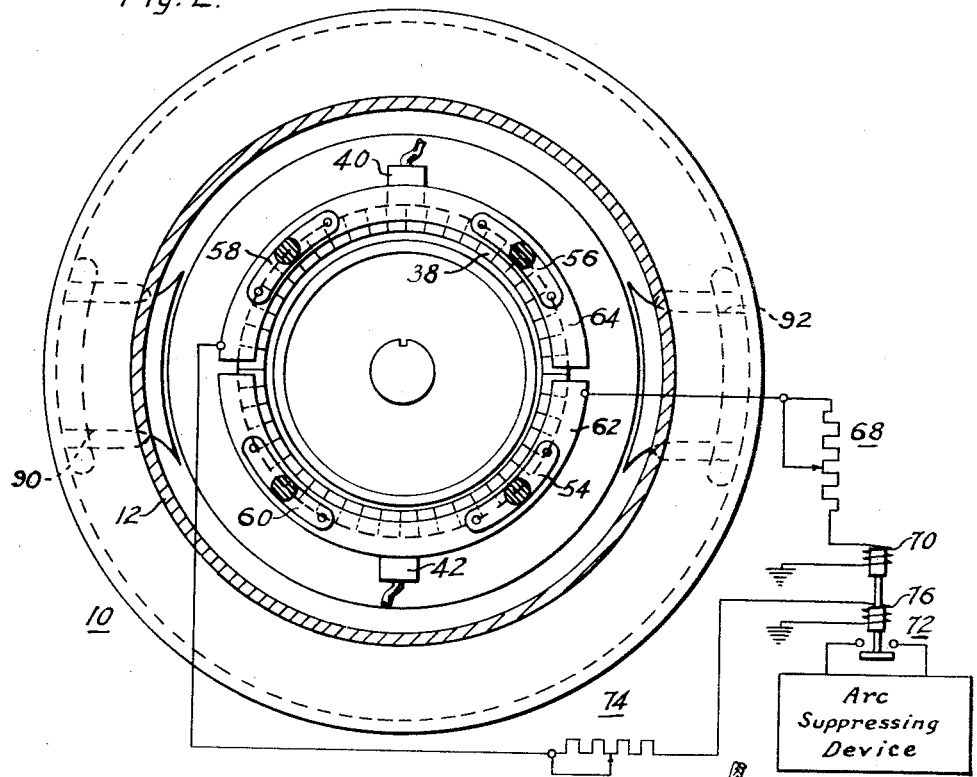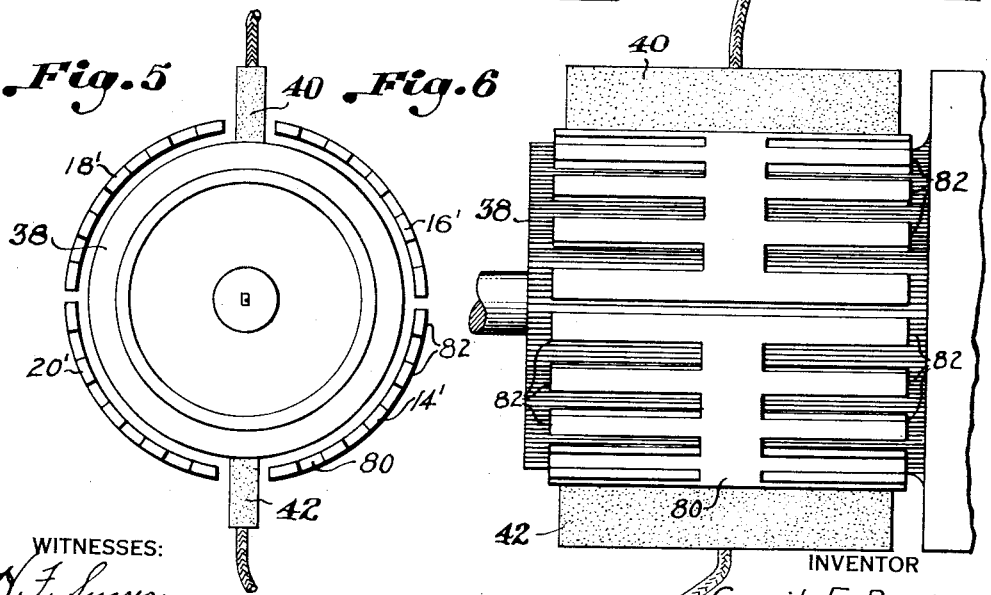

Oct. 10, 1939.  C. E. BASTON  2,175,821
ELECTRIC PROTECTIVE DEVICE
Filed Sept. 10, 1937  3 Sheets—Sheet 3
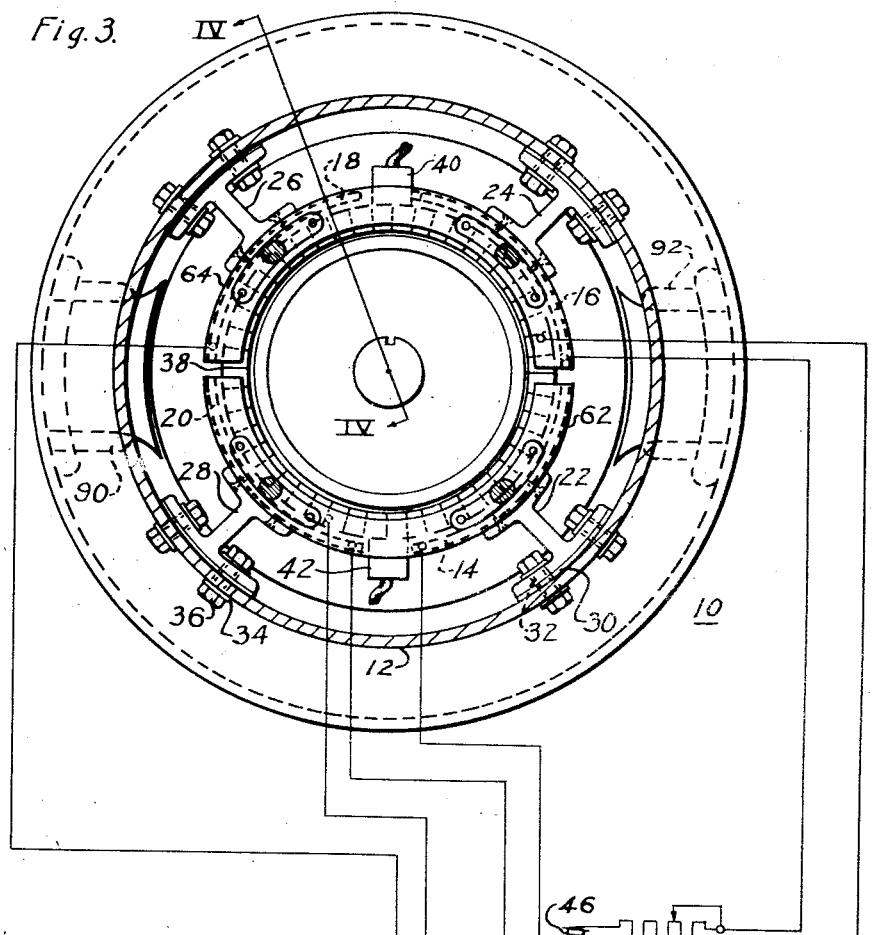
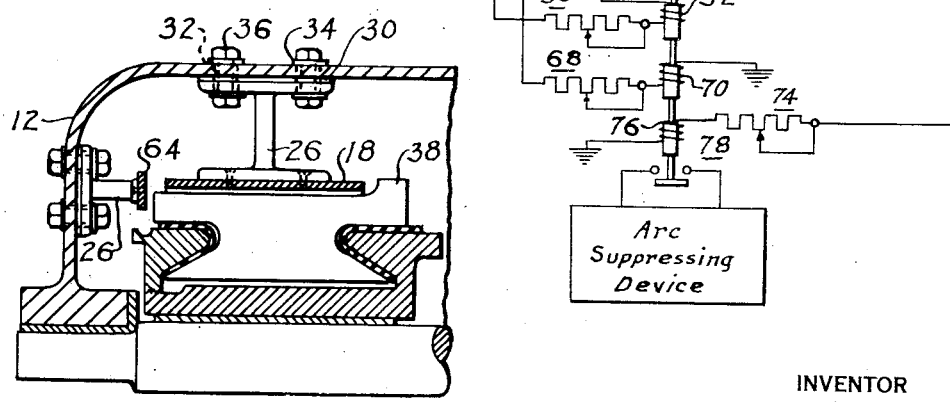
INVENTOR
Cyril E. Baston.
BY
ATTORNEY Patented Oct. 10, 1939

2,175,821

UNITED STATES PATENT OFFICE 2,175,821

ELECTRIC PROTECTIVE DEVICE

Cyril E. Baston, Wilkinsburg, Pa., assignor to The English Electric Company, London, England, a company of Great Britain Application September 10, 1937, Serial No. 163,209
In Great Britain September 16, 1936

14 Claims. (Cl. 171—228)

My invention relates, generally, to protective devices, and, more particularly, to devices for protecting dynamo-electric machines from excessive damage due to flashover.

In the operation of commutator type dynamo-electric machines, a condition commonly known as a flashover often obtains. This condition is manifested in an arc extending between adjacent brushes and between the commutator or brushes and the frame of the machine or ground. Such arcing, if not suppressed, causes serious damage to the machine, the arc melting the commutator bars and other parts of the machine with which it comes in contact.

An object of my invention is to provide a protective system which shall function to suppress flashover arcs on cummutator type dynamo-electric machines.

Another object of the invention is to provide a flashover responsive device which shall function to so affect the energization of the machine upon which the flashover occurs as to suppress the flashover arc.

These and other objects and advantages of the invention will be apparent from the following detailed description taken in connection with the accompanying drawings, in which:

Figure 1 is a diagrammatic illustration of a dynamo-electric machine with one form of the system of the invention applied thereto, Fig. 2 is a diagrammatic representation of a dynamo-electric machine with a form of the invention which suppresses flashover to ground applied thereto, Fig. 3 shows a machine with both the brush-to-brush and the ground flashover responsive devices applied thereto, Fig. 4 is a partial sectional view taken along line IV—IV of Fig. 3, showing the relations of the parts of the device; and, Fig. 5 and Fig. 6 are end and side elevation views, respectively, of one form of electrode plate for the protective system.

In carrying out my invention, I provide electrode plates, hereinafter referred to as conducting members, overlying and spaced from the commutator of a dynamo-electric machine and disposed in the paths usually taken by flashover arcs to ground and between brushes. Electro-responsive means for suppressing the arc are connected in circuit with these conducting members.

Referring now to the drawings, there is shown in Figure 1 a dynamo-electric machine 10 having an end bell 12, shown in section, from which arcuate conducting plates 14, 16, 18 and 20 are supported by brackets 22, 24, 26 and 28. The brackets 22, 24, 26 and 28 are insulated from the end bell 12 in the manner shown in detail in the partial section of bracket 22. Referring to this section, the insulating members comprise an arcuate plate of insulating material 30, which lies between the end bell 12 and the bracket 22, sleeve 32 and washer 34, the whole being held in place by bolts 36.

The conducting members 14, 16, 18 and 20 are arcuate shaped, overlie and are spaced from the commutator 38 of the machine 10. One end of each of these conducting members is positioned adjacent one of the brushes 40 and 42 of the machine 10 and the other ends are spaced from each other, as shown in the drawings.

The pair of conducting members 14 and 16 are connected in series circuit relation with a variable resistance 44 and a coil 46 of relay 48. The pair of conducting members 18 and 20 are connected in series circuit relation with a variable resistance 50 and a coil 52 of relay 48, so that the application of electrical potential between either of these pairs of conducting members will actuate the relay 48.

The contact elements of relay 48 are connected in circuit with field control relay 84 to energize relay 84 from the source of control energy shown when relay 48 is energized. The back contact elements 86 of relay 84 are connected in series circuit relation with the field coils 90 and 92 of the dynamo-electric machine 10 and connect these field coils to the source of field energization shown. The front contact elements 88 of relay 84 serve to connect a resistor 94 in series circuit relation with the field coils 90 and 92.

In the operation of the device of Fig. 1, in the event that an arc is established between brushes 40 and 42 around the commutator, the path which this arc will naturally follow will be from the commutator adjacent one brush to the adjacent conducting member, from this conducting member across the gap between the conducting members of the pair to the other conducting member, and from the other conducting member back to the commutator. It will be seen that the potential drop in that part of the arc which is established between the adjacent conducting members will be applied to the circuit to which these conducting members are connected and one of the coils of relay 48 will be energized. The energization of relay 48 will cause it to close its contact members to energize relay 84. The energization of relay 84 will cause it to open its contact members 86 and close contact members 82 to disconnect the field coils 90 and 92 from their source of energization and to connect resistor 94 in circuit with these field coils to dissipate the energy therein. The deenergization of the fields of motor 10 will suppress the flashover arc which will, in turn, deenergize relays 48 and 84 to permit contact elements 86 to close to again energize the field coils 90 and 92 of machine 10, restoring the machine to normal.

Thus, if an arc is established between brushes 40 and 42 in such a manner that conducting segments 14 and 16 lie in the path of such arc, relay 48 will be operated as a result of the energization of its coil 46. In like manner, an arc established between the brushes 40 and 42 on the other side of the commutator will cause a potential to be established between conducting members 18 and 20 which will result in the operation of relay 40 by the energization of its coil 52.

The adjustable resistances 44 and 50 are connected in circuit with the relay coils 46 and 52, respectively, for the purpose of limiting the current which may flow in these coils 46 and 52 to prevent damage thereto.

It is understood that the specific means for suppressing the flashover described in connection with the discussion of the operation of the device of Fig. 1 is only one of several different methods of arc suppression that may be employed. A cut-out switch for deenergizing the armature of the machine, means for short circuiting the armature of the machine or any other common method of suppressing the arc may be made responsive to the energization of relay 48. For this reason and for the reason that the invention lies chiefly in the arc responsive means, the apparatus which is made responsive to the energization of the flashover arc responsive relays in the devices of Figs. 2 and 3 are merely indicated as arc suppressing devices.

Referring now to Fig. 2, motor 10, having a commutator 38 and brushes 40 and 42, has suspended from the end bell 12 by means of brackets 54, 56, 58 and 60, two arcuate conducting members 62 and 64. The conducting members 62 and 64 overlie the ends of the bars of the commutator 38 and are positioned between the commutator 38 and the adjacent end bell 12 so as to lie in the normal path of flashover arc from commutator to ground or from brush to ground.

The brackets 54, 56, 58 and 60 may be insulated from the end bell 12 in the same manner as described hereinbefore in connection with brackets 22, 24, 26 and 28 in Fig. 1.

Conducting member 62 is connected through an adjustable resistance 68 to one side of coil 70 of relay 72, the other side of the coil 70 being grounded, as shown. Conducting member 64 is conducted through a variable resistance 74 to one side of coil 76 of relay 72, the other side of coil 76 also being grounded, as shown. The contact members of relay 72 are connected to energize an arc suppressing device such as was described in connection with the apparatus of Fig. 1 hereinbefore.

In the operation of the device of Fig. 2, it will be seen that should a flashover from the commutator 38 or from one of the brushes 40 or 42 to the end bell 12 occur, one of the conducting members 62 and 64 will lie in the path of the arc established by such a flashover and a potential will exist between one of the conducting members 62 and 64 and ground, which is equal to the potential drop in the flashover arc between the conducting members 62 and 64 and ground, and this potential will be applied to the relay coil circuit connected to the one of the conducting members 62 and 64 which lies in the flashover arc. This energization of the relay 72 will cause the relay to operate to actuate the arc suppressing device which, in turn, will eliminate the arc before any great damage is done to the parts of the machine.

In Fig. 3, a dynamo-electric machine 10 is shown with a combination of the arc suppressing devices shown in Figs. 1 and 2 applied thereto. The relation of the conducting members to each other and to the commutator 38 and end bell 12 are more clearly shown in Fig. 4.

It will be seen that the connections of the coils of the relay 78 are the same as those discussed in connection with the devices of Figs. 1 and 2. The operation of the system of Fig. 3 is substantially the same as that of both Figs. 1 and 2, the relay 78 being energized to actuate the arc suppressing device when either coil 46 or 52 is energized because of a flashover between the brushes of the machine or whenever coil 70 or coil 76 is energized because of flashover from the commutator or one of the brushes of the machine to ground.

An alternative form of conducting member for use in connection with the form of the invention shown in Figs. 1 and 3 is shown in end elevation in Fig. 5, and side elevation in Fig. 6. Each of the conducting members 14', 16', 18' and 20' of this modification consists of a comparatively narrow ring portion 80 having finger-like members 82 extending from each side of the ring member 80 to cover substantially the entire width of the commutator. This modification of the conducting members permits of lighter construction and also facilitates ventilation of the commutator, while at the same time, adequately covering the surface of the commutator to detect any flashover arcing between the brushes of the machine.

It will be seen that I have provided a device for suppressing flashover arcing between brushes, between a brush and ground or between the commutator and ground of a dynamo-electric machine, which is simple and reliable in operation and easily manufactured and installed.

In compliance with the requirements of the patent statutes, I have shown and described herein the preferred embodiments of my invention. It is understood, however, that the invention is not limited to the precise constructions shown and described but is capable of modification by one skilled in the art, the embodiments herein shown being merely illustrative of the principle of my invention.

I claim as my invention:

1. In a protective device for a dynamo-electric machine having a commutator, a pair of electrically conducting members overlying and spaced from the commutator surface, means electrically insulating said members from the commutator, and an electro-responsive device connected in series circuit relation between said conducting members.

2. In a protective device for a dynamo-electric machine having a commutator, a plurality of electrical conducting members overlying and spaced from the commutator surface, an electro-responsive device having a plurality of actuating windings, and means for connecting each of said windings in circuit with a separate one of said conducting members.

3. In a protective device for a dynamo-electric machine having a commutator, a plurality of electrically conducting members so disposed with relation to the commutator that at least one of said members will lie in the arc path should a flashover occur, means electrically insulating said members from the commutator, and an electro-responsive device connected in series circuit relation between said conducting members.

4. In a device for protecting the commutator of a dynamo-electric machine against flashover, an arcuate shaped conducting member, means for supporting said member to overlie the armature while spacing it therefrom in the normal path of flashover to ground, means insulating said member from ground and from all of the parts of the dynamo-electric machine, and an electro-responsive device connected in circuit between said conducting member and ground.

5. In a protective device for a dynamo-electric machine having a commutator, a plurality of arcuate electrically conducting members so disposed as to overlie the cylindrical surface of the commutator, means spacing said members from the commutator, means insulating said members from the parts of the dynamo-electric machine and ground, and electro-responsive means connected in series circuit relation between said conducting members.

6. In a device for protecting the commutator of a dynamo-electric machine against flashover, an electrically conducting member overlying and spaced from the end surface of the commutator bars, means electrically insulating said member from the commutator, and electro-responsive means connected in circuit with said member.

7. In a device for protecting the commutator of a dynamo-electric machine against flashover, an electrically conducting arcuate shaped member of less width than the axial width of the commutator, said member having spaced protuberances of such length as to extend substantially the width of the commutator, and means for mounting said member so that the member and its protuberances will overlie and be spaced from the surface of the commutator.

8. In a device for protecting a dynamo-electric machine against flashover of its commutator, an electrically conducting member overlying and spaced from the commutator surface, and electro-responsive means for opening the field circuit of the dynamo-electric machine connected in circuit with said conducting member.

9. In a device for protecting a dynamo-electric machine against flashover of its commutator between adjacent brushes, a pair of circumferentially spaced conducting elements overlying the commutator surface between each adjacent set of brushes and spaced from the commutator, and an electro-responsive device connected in circuit between said pair of conducting members.

10. In a device for protecting a dynamo-electric machine from flashover to ground from its commutator and brushes, a pair of circumferentially spaced arcuate conducting members axially spaced from and overlying the ends of the commutator bars and disposed in the normal path of flashover to ground, and an electro-responsive device connected to ground in circuit with each of said conducting members.

11. In a protective system for dynamo-electric machines, conducting members spaced from the parts of the machine and disposed in the normal flashover arc paths, and electro-responsive means for deenergizing the field of the machine connected in circuit with each of said conducting members.

12. In a protective system for dynamo-electric machines, conducting members spaced from the parts of the machine and disposed in the normal path of flashover to ground, other conducting members spaced from the parts of the machine and disposed in the normal path of flashover between brushes, and electro-responsive means connected in circuit with said conducting members.

13. In a protective system for a commutator type dynamo-electric machine, a plurality of circumferentially spaced arcuate conducting members axially spaced from and overlying the ends of the commutator bars and disposed in the normal path of flashover to ground, a plurality of arcuate circumferentially spaced conducting members radially spaced from and overlying the brush engaging surface of the commutator and disposed in the normal path of flashover between brushes, and electro-responsive means for suppressing the flashover connected in circuit with each of said conducting members.

14. In a protective system for a commutator type dynamo-electric machine, electro-responsive means for suppressing a flashover on the machine, and means responsive to a flashover condition on the machine for energizing said electro-responsive means, said flashover responsive means comprising conducting members electrically insulated from the machine and disposed in the normal path of the flashover arc, said electro-responsive means being connected in series circuit relation with said conducting members.

CYRIL E. BASTON.